Sept. 14, 1943.     E. STAFFORD ET AL     2,329,226

POULTRY FREEZING

Filed Jan. 9, 1942

INVENTORS.
Charles H. Welling
and Earl Stafford
by Kenway & Witter Attys

Patented Sept. 14, 1943

2,329,226

UNITED STATES PATENT OFFICE 2,329,226

POULTRY FREEZING

Earl Stafford, Reading, Mass., and Charles Hunt Welling, New Canaan, Conn., assignors, by direct and mesne assignments, to Z Pack Corporation, Boston, Mass., a corporation of Delaware Application January 9, 1942, Serial No. 426,158

6 Claims. (Cl. 62—170)

This invention consists in a novel process of producing tender, quick frozen poultry. Its principal object is to produce uniformly a frozen product of tender texture and superior flavor. The process is characterized by the steps of rapidly reducing the internal temperature of the bird immediately after killing, then maintaining the bird for at least a critical interval of time surrounded by a medium slightly above the freezing point and finally quick freezing the bird which has been chilled in the manner outlined.

For several years poulty, including chickens, ducks and turkeys, has been quick-frozen commercially in large quantities by the spray or showering process known to the trade as the "Z-process." In this process sodium chloride brine is alternately circulated first over chilling coils in a heat exchanger and thereafter over the product being frozen until the latter is quick-frozen all the way through, the temperature of the brine being maintained at or near zero degrees F. Following the freezing step the superficial layers of skin are slightly thawed by dipping in or spraying with water. This step restores the normal pink color of the skin, and is known as "blooming," and the residual "cold" within the frozen bird causes the water layer adhering to the skin rapidly to freeze again forming a glaze, that enhances the appearance and protects the bird against excessive evaporation or dehydration during storage. A preferred method of carrying out these steps is disclosed in U. S. Patent No. 2,145,-323, granted to Earl Stafford, one of the present applicants.

The importance to the industry of this spray or showering method of quick-freezing poultry has been particularly apparent in the case of the New York dressed or non-eviscerated type, although the process is also used commercially on and is equally well adapted to eviscerated poultry. It is a fact generally accepted in the trade that the best quality quick-frozen New York dressed poultry is frozen by this direct contact shower or spray process. The reason for this fact and the importance of our novel spray-chill improvement will be brought out in the discussion below.

Most of the frozen, or as the trade calls it "hard chilled" poultry that is shipped from the interior of the United States to the seaboard— around 800,000,000 lbs. annually, is non-eviscerated and is known as New York dressed. It is prepared by bleeding, plucking and removing pin feathers, air cooled and packed twelve in a box, breasts up and with heads, necks and legs tucked underneath out of sight. The boxes of 12 are generally placed in the sharp-freezer maintained at well below zero degrees F., and after the 48 hr. required to "hard chill" the birds, they are moved into the regular zero storage until shipped. The time between killing and complete freezing averages more than two days— and by no stretch of the imagination can this operation be called quick-freezing. In this commercial practice decomposition in the bird sets in within the intestinal tract, bile permeates the entrails and muscle meat in the vicinity of the liver, and the bitter taste spreads rapidly from the kidneys during the entire time that elapses between killing and complete freezing. New York dressed poultry frozen slowly in a manner similar to that indicated above will always have a "gutty" off-flavor, this off-flavor being particularly apparent when the second joint is removed from such a bird after roasting. Improper handling after leaving zero storage will increase the amount of this unpleasant gutty flavor and odor, but it can be detected in every bird that is slow frozen before evisceration by present day practice.

We have found that the gutty flavor of non-eviscerated poultry can be entirely eliminated by quick-freezing by the spray-freeze method immediately after killing. Decomposition within the intestinal tract and migration of the bitter flavor from the bile and from the kidneys does not continue after freezing is complete and the short time required for quick-freezing under these conditions is not long enough to permit these deleterious actions to occur.

However, we have found that poultry that is quick frozen by the spray-freeze method or by any other method immediately after killing is tough, and the reason for this is that rigor mortis sets in shortly after death and if the poultry is frozen while the muscles are in the contracted state of rigor mortis, this contracted state persists during the freezing and storage period and in part thereafter, and consequently the bird is tough when cooked and served. Tests for tenderness made on identical muscles from a series of birds killed at the same time and tested at hourly intervals thereafter show that at least four hours should elapse between killing and quick-freezing if the resultant birds are to be tender when cooked and eaten. Most commercial operations provide for a variable delay period between killing and freezing because of the difficulties of scheduling killing and packing so that both operations are kept in step. Under such commercial conditions the optimum delay period of four hours may well be stretched out to several times four hours.

We have found by careful examination that birds held even for the minimum time of four hours under present commercial conditions between killing and quick-freezing show a certain amount of decomposition in the intestinal tract and that stains and odors develop from the bile and kidneys which lower the quality of the bird, regardless of the excellence of the quick-freezing method subsequently employed.

We have discovered, however, that these deleterious reactions can be entirely eliminated, even if the delay period between killing and quick-freezing is extended to 24 hours or more, if, immediately after killing, the birds are rapidly chilled to a point a few degrees above the freezing point, and thereafter held at a temperature between 32 and, say, 40 degrees F. During this delay period the birds may be eviscerated and subsequently quick-frozen by any process, or the birds after holding for any reasonable period may be quick frozen as New York dressed. We have also discovered that birds so pre-chilled, immediately after killing and plucking, may be slow-frozen or "hard chilled" in the sharp freezer and will produce better poultry and with much less of the gutty flavor than will be the case if this rapid pre-chilling step is omitted or if present commercial methods of pre-chilling are employed, such as soaking in a tank of cold water or spraying with the coldest water available.

An object of our invention is to make available an improved and novel process of rapidly removing heat from the body of a freshly killed bird, without freezing the bird, so that its internal temperature may be lowered to near 40 degrees F. within a matter of minutes instead of hours regardless of how the bird is later handled.

Another object of our invention is to provide a novel three-step freezing process for non-eviscerated poultry which will produce a product of highest quality and without the stains, odors and off-flavors always present in slow-frozen, non-eviscerated poultry and which are present to a lesser degree in the best quick-frozen, non-eviscerated poultry, that has been quick-frozen after rigor mortis has passed. Our novel process is characterized by a first step in which the birds are rapidly chilled immediately after killing by spraying or showering, or otherwise contacting them with a refrigerant solution at a temperature near or below the freezing point, but not low enough in temperature or for a period of time long enough actually to freeze the bird, and then, by a second step comprising a delay period at least long enough to permit the passing of rigor mortis, and during which the birds are held in a suitable room at a temperature just above the freezing point, and finally by a third step, the quick freezing of the birds.

An important application of our invention is realized by carrying out the first two steps as described above, and as a third step, after the delay period, quick freezing non-eviscerated birds by a spray or shower of a suitable direct contact refrigerant.

Another important application of our invention is realized by carrying out the first step as described above, and then, as the second step and during the delay period, eviscerate the birds and then finally as the third step, quick freezing the eviscerated birds.

The application of this novel three-step process in the art of quick-freezing poultry has been explained above in so far as it relates to the freezing of the New York dressed type. In the case of eviscerated poultry the opportunity for quality improvement over the regular commercial procedures is equally great, and at times even more important. Most eviscerating operations are carried on birds which would otherwise be treated in a system producing the New York dressed type. Generally at a given plant during a given run only birds of a certain size, three pounds, for example, are picked out for evisceration. Since, in most cases, the packing plant receives birds of all sizes, it is apparent that the supply of the particular birds desired for evisceration will be irregular. In order to insure a steady supply of birds for the eviscerating line it is customary to accumulate a stock of such birds before starting up the eviscerating line and generally a relatively large supply is held in the chill-room or cooler. One of the largest producers of quick-frozen eviscerated poultry plans on holding the birds between killing and eviscerating for a period not longer than eighteen hours—but under the irregular conditions of commercial operation the average time that this producer holds the birds is considerably longer than eighteen hours. Since the lowering of the internal temperature of freshly killed birds in such a chill-room is very slow, and since the total time elapsing between killing and evisceration is so long, it is apparent that considerable decomposition within the intestinal tract occurs and that the quality of the meat definitely suffers.

The real problem involved in the production of highest quality quick-frozen poultry—whether eviscerated or New York dressed—from the combined standpoint of flavor and odor and tenderness, is concerned with a rapid lowering of the internal temperature of the birds immediately after killing and plucking and maintaining the birds at a relatively low temperature, preferably between 32 and 40 degrees F. until the birds can be finally quick-frozen. Present commercial practice is to hang up the prepared birds on V-shaped frames and when the frame is filled to push them into a chill-room maintained as near 32 degrees F. as possible. It is a well-known fact that under these conditions at least 24 hours are required for the internal temperature of the birds to fall to 40 degrees F. During much of this period the deleterious changes discussed above are progressing at a rapid rate. Birds eviscerated after such a slow chilling are likely to have the undesirable gutty flavor.

In carrying out the first step of our novel quick-freezing process we have found that freshly killed birds may be chilled from a temperature of about 100 degrees F. to about 45 degrees F. (internal) within a period of from 15 to 30 minutes, depending on the size of the bird, and on the chosen temperature of the refrigerated brine used as the spray-chilling medium. Such pre-chilled birds can then be placed in a chill-room at near 32 degrees F. and the internal temperature will gradually fall to about 43 degrees F. during the first hour and to about 40 degrees at the end of four hours and, of course, will finally attain the temperature of the chill-room if the delay period is long enough. Thus intestinal decomposition and allied changes are practically prevented or at least reduced to a minimum.

The temperature of the chill-spray direct contact refrigerant may be as low as 23 degrees F., or slightly lower, when the birds are chill-sprayed for a relatively short period, say 15 minutes. For larger birds the temperature should be somewhat higher, say 27 degrees F. and the time under spray-chill would be increased to about 30 minutes. It is apparent that the time-temperature relationship is somewhat flexible and may be adjusted to suit the conditions. Certain thin parts of the bird, such as wing tips, may become slightly frozen at the lower temperatures employed, but these thaw out at once when removed from the chill-spray and when placed in the chill-room above 32 degrees F. Such slight and incidental freezing does no harm, although the quality will not be improved and may be harmed if much of the bird is frozen and then thawed at this stage. The suggested lower temperature, 23 degrees F., is not critical and either somewhat lower temperatures or higher temperatures up to 32 degrees F. may be employed with success. In general if a temperature at the lower end of the range is chosen, the outside of the bird will rapidly approach the freezing point, and the superficial layers of the skin may become slightly frozen, before the internal temperature has been lowered to 45 or even 50 degrees F., and thus the spray-chill step will be stopped before the maximum amount of heat has been removed from the bird. If a somewhat higher temperature is chosen, say 25 to 30 degrees F., the time under the spray-chill will be longer, but the internal temperature may be reduced to nearer 40 degrees F., without the complication of superficially freezing the wing tips, and the outer layers of the skin.

It will be seen from the foregoing description that water is not a satisfactory chilling medium for use in carrying out the process of our invention. Cold enough water is not available in adequate supply. Water at 50 degrees F., which is about as cold as may be obtained from any natural water supply, requires more than an hour to reduce the temperature of freshly killed poultry to 50 degrees F. As already explained this chilling rate is too slow and the final temperature too high for satisfactory results as measured by the achievement of our invention. It is moreover, impractical to circulate water over freezing coils because the water tends to freeze to the refrigerating pipes.

The specific apparatus to be used in carrying out our novel process is not the subject of this invention, nor is the invention limited to any particular procedure in applying the refrigerant to the surfaces of the poultry being chilled or frozen, except in so far as it is desirable to cause the refrigerant solution to flow rapidly and freely over and from the said surfaces to insure a rapid heat interchange. To this end a series of sprays may be located above the poultry to be chilled and after showering the poultry the somewhat warmed solution may be collected in a suitable container and caused to flow over chilling coils, containing evaporating liquid ammonia, for example, and then be again pumped through the spray nozzles to continue the chilling of the poultry. Or, instead of spray nozzles, a series of conduits with small holes may be used to cause a needle like spray to impinge on the surfaces of the poultry. Or, a distributing pan, with suitably situated perforations may be placed above the poultry and the chilled liquid may be pumped from the tank below the chilling coils to this distributing pan so that it will flow over the poultry by gravity and return again to the chilling device, or heat exchanger, and then again be pumped back to the distributing pan. Or, the chilling coils may be placed above the chamber in which the poultry is to be contacted with the refrigerant, with a suitable perforated pan above the coils into which the somewhat warmed solution is pumped. The solution in that case flows by gravity over the chilling coils to a second distributing pan, with perforations, or the equivalent, and then flows over the surfaces of the poultry, and thence to a suitably positioned sump, from which a pump returns the somewhat warmed solution back to the distributing pan above the chilling coils. Almost any method that insures a rapid circulation of the refrigerant solution, alternately, over a cooling surface and the surfaces of the poultry will serve the purpose.

The features and advantages above discussed and others incidental to our invention will be best understood and appreciated from the following detailed description of a preferred manner of putting the process into practice as illustrated in the accompanying drawing in which—

Figure 1:
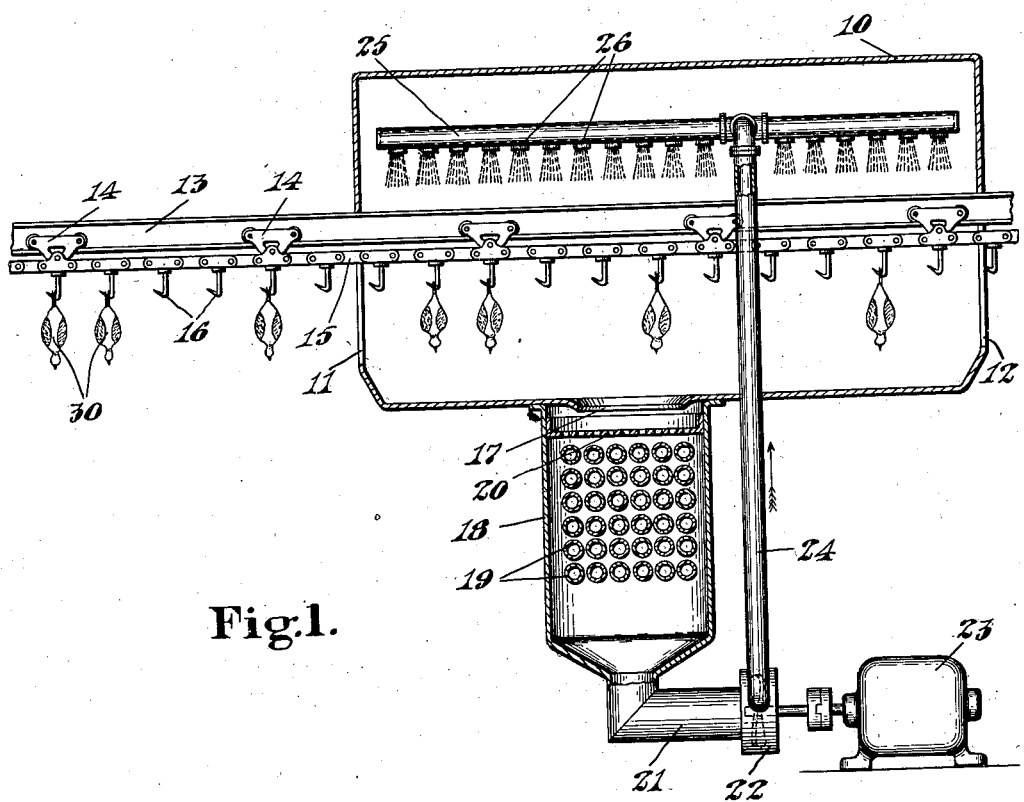
Fig. 1 is a diagrammatic view of one satisfactory type of apparatus.

In describing the apparatus illustrated in Fig. 1 it must be borne in mind that this drawing is diagrammatic only, and that the heat insulating chamber 10 represented therein will in practice be of different dimensions and considerably longer than there is room to indicate in the diagram. The chamber 10 is provided with openings 11 and 12 in its opposite ends through which extends a track 13, herein shown as an I beam with a series of roller carriages 14 arranged to run on the lower flange thereof. The carriages 14 are connected at intervals to a conveyor chain 15, through which extend a series of downwardly projecting hooks 16.

Figure 2:
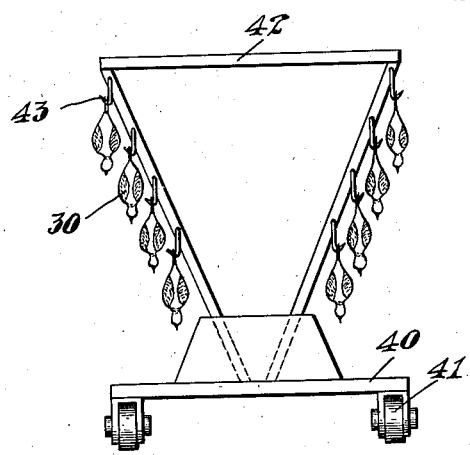
Fig. 2 is a view in end elevation of a rack suitable for use in connection with an alternative form of apparatus.

The track and chain conveyor are such as are commercially used in poultry plants, and are run along or above the cooling and plucking line. The freshly killed birds are generally hung by their feet on the hooks 16 and bled at the neck. As they advance along the track they are plucked and pinned, and pass to the final inspection. After inspection they are removed and usually placed on racks as indicated in Fig. 2. As illustrated herein it may be assumed that the chain conveyor is extended beyond the inspection station and passes through the openings 11 and 12 of the insulated chamber 10 in which the birds are contacted with the chilling refrigerant solution. It will be generally found more convenient to transfer the birds from the plucking line to a separate chain carrier, since this will eliminate exposure of the longer chain to brine and will permit the chain in the chilling chamber to be made of materials better adapted to withstand corrosion, stainless steel, for example. An alternative procedure would be to transfer from the plucking line to racks such as those shown in Fig. 2, and to pass these racks through the chamber 10. It will also be found advisable to contact the birds, after the chilling spray, with a second spray of cold water for a very short period, so as to remove much of the adhering brine. This may be accomplished in a small section of a tunnel immediately adjoining the chill-spray tunnel.

One satisfactory arrangement for circulating the liquid refrigerant is shown in Fig. 1. The chamber 10 is provided in its bottom with a downwardly flanged outlet opening 17 communicating directly with a casing 18 traversed by a nest of refrigerating pipes 19 which are supplied with a suitable primary refrigerant, such as liquid ammonia from a source not shown. Above the refrigerating pipes is provided a strainer 20. The casing 18 is provided with a downwardly tapering bottom leading to a short outlet duct 21 and this leads directly to a centrifugal pump 22 operated by a motor 23. The pump 22 has a vertical outlet pipe 24 which extends upwardly in the chamber 10 where it communicates with one or more headers 25 provided above the track 13 with downwardly directed spray nozzles 26. The sprayed refrigerant issuing from the nozzles 26 showers the birds passing through the chamber on the conveyor. It flows over the birds being slightly warmed by the heat extracted therefrom and then flows out through the outlet 17 and downwardly over the refrigerating pipes 19 where it is cooled to the desired initial temperature. The cooled refrigerant passing out of the bottom of the casing 18 is then recirculated by the pump 22 to the nozzle 26 in a continuous process.

The length of the chilling chamber should be such that a period of at least 15 minutes is required for the birds 30 to pass through it. The dimensions of the chamber will be determined by the rate of travel of the chain conveyor and this varies in different plants. However, should this rate be so rapid that the length of the chilling chamber must be longer than convenient, it will be advisable to direct the chain conveyor in a looped path so as to conserve floor space.

As the chilled birds 30 pass out of the opening 12 of the chamber 10 they may be removed from the conveyor, preferably after a short water rinse, and placed on racks such as that shown in Fig. 2, or the equivalent, and be wheeled into a chilling medium, or the conveyor chain through the chill spray tunnel, preferably after a water rinse may be directed into a chilling room and without further intermediate handling the birds may pass the grading and sorting stations, and then be removed from the chain conveyor. Obviously if passage through the chamber 10 is on racks instead of on a chain conveyor it will not be necessary to transfer the birds as just described. However this is accomplished, the second step of our process requires the chilled birds, now having a body temperature of not more than 50 degrees F. to be maintained at a temperature between 32 degrees and 40 degrees F. until rigor mortis passes and generally this interval of time should be at least 4 hours, and there is no objection to extending this step for a longer interval if convenient in the system of the plant.

The rack shown in Fig. 2 comprises a base 40 having truck wheels 41 and a triangular frame 42 supporting longitudinal and inclined side bars provided with a series of hooks 43. At the conclusion of the delay period of four hours or longer in the chill-room, and after the passing of rigor mortis, the birds may be removed from the rack shown in Fig. 2 and packed for final storage, shipment and sale. They may be packed in a box as New York dressed and be quick frozen by the brine spray, or by other suitable quick-freezing means. One satisfactory method of carrying out this last step is disclosed in U. S. Patent No. 2,145,323, granted to Earl Stafford. The birds may be eviscerated and frozen by any means, or they may be packed in barrels or boxes and placed in the sharp freezer. This last method of carrying out the final step of our novel three step process will produce a "hard chilled" bird that is far superior to that produced by standard commercial processes today that do not succeed in reducing the internal temperature of the bird rapidly enough to prevent the occurrence of the deleterious changes that take place during a slow pre-chill. Our preferred method involves quick-freezing of the birds as the final or third step, but where equipment is not available or when circumstances do not warrant the use of true quick-freezing as the final step, a superior pack of "hard chilled" poultry may be produced by employing the sharp freezer, provided that the poultry immediately after killing has been protected by a spray chilling step with a brine spray operating below the freezing point of water.

Having thus described our invention what we claim as new and desire to secure by Letters Patent is:

1. The process of producing tender quick-frozen poultry, which consists in rapidly reducing the body temperature of a freshly killed bird to below 50° F. by showering with a refrigerated brine at a temperature below the freezing point of water, holding the chilled bird for about four hours in a medium having a temperature between 32 degrees and 40 degrees F., and subsequently quick freezing the bird.

2. The process of producing tender quick-frozen poultry, which consists in rapidly reducing the body temperature of a freshly killed bird to below 50° F. by showering with a refrigerated brine at a temperature below the freezing point of water, then slowly reducing its body temperature to about 40 degrees F. in a period of at least four hours duration, and subsequently quick-freezing the bird.

3. The process of producing tender quick-frozen poultry, which consists in subjecting a freshly killed bird to a refrigerating spray at a temperature of 23 degrees to 30 degrees F. for about 15 to 30 minutes, and thereby rapidly reducing the body temperature of the bird below 50° F., maintaining the bird in chilled but unfrozen condition until rigor mortis has passed, and then quick-freezing the chilled bird.

4. The process of producing tender quick frozen poultry, which consists in rapidly chilling a freshly killed bird by reducing its body temperature below 50° F. by showering with a liquid refrigerant at a temperature below 30° F. before the occurrence of any substantial decomposition in the bird, holding the chilled bird, without freezing it, at a temperature between 32 degrees and 40 degrees F. for an interval of time in which rigor mortis passes, and subsequently eviscerating and quick freezing the chilled bird.

5. The process of producing tender quick-frozen poultry, which consists in rapidly chilling a freshly killed bird by subjecting it to a refrigerating spray at a temperature of 23 degrees to 30 degrees F. and thereby reducing its body temperature to a point at which no substantial decomposition will take place, holding the chilled bird, without freezing it, at a temperature between 32 degrees and 40 degrees F. for an interval of time sufficient for rigor mortis to pass, then freezing the chilled bird.

6. The process of producing tender quick-frozen poultry, which consists in subjecting a freshly killed bird to a refrigerating spray at a temperature of 23 degrees to 30 degrees F. for about 15 to 30 minutes, and thereby rapidly reducing the body temperature of the bird below 50° F., maintaining the bird in chilled but unfrozen condition until rigor mortis has passed, and then quick freezing the chilled bird by directly contacting the bird with a spray of refrigerated brine.

EARL STAFFORD.
CHARLES HUNT WELLING.